UNITED STATES PATENT OFFICE.

THOMAS BUTLER JOSEPH, OF MERCUR, UTAH.

GOLD-EXTRACTING PROCESS.

SPECIFICATION forming part of Letters Patent No. 718,633, dated January 20, 1903.

Application filed December 31, 1900. Serial No. 41,738. (No specimens.)

*To all whom it may concern:*

Be it known that I, THOMAS BUTLER JOSEPH, a citizen of the United States, residing at Mercur, in the county of Tooele and State of Utah, have invented certain new and useful Improvements in Gold-Extracting Processes; and I do hereby declare the following to be a full, clear, and exact description of the invention, such as will enable others skilled in the art to which it appertains to make and use the same.

My invention relates to the extraction of precious metals, but more particularly to gold, and has for its object to extract gold from ore containing the same when in a suitable condition.

A further object of my invention is to provide a process for extracting precious metals which can be used on base ore, and which will not be neutralized by the presence of arsenic or sulfur, and which will leach both roasted and unroasted ore.

It must be understood that I cannot state definitely how fine the ore should be crushed, as loose sand ore should be leached in its natural state, while soft ores should not be crushed as fine as hard or base ores, the process of crushing depending entirely upon the quality, impenetrability, and hardness of the ore to be leached.

In carrying out my invention after the ore has been crushed as aforesaid I subject the same to the leaching action of a diluted solution composed of water, cyanid of potassium, hydrate of calcium, and liquefied carbon dioxid or carbonic-acid gas, in conjunction with compressed air conveyed therein through the bottom from an air-compressor.

In carrying out my process such vessels which have been found to be most practical in the extraction of gold are used, although I prefer those made of wood, as metal will be more or less subject to the chemical action of the leaching solution, and I prefer to have the storage-tank standing at one side and at a higher elevation than the ore-leaching tank, so that the leaching solution will run by the force of gravity into the tank containing the ore.

The leaching solution, composed of water, cyanid of potassium, and hydrate of calcium, is made in the storage-tank, and when liquefied carbon dioxid is desired to be used the same may either be admitted to the storage-tank or mixed in the leaching-tank containing the ore. When carbonic-acid gas is used, the same can be obtained from burning limestone into oxid of lime, and the gas conveyed by a pipe either into the leaching liquor in the storage-tank or directly into the leaching-tank, or into both tanks, if desired. When said gas is conveyed into the storage-tank, I prefer to provide said tank with a cover of canvas or other suitable material, as without said cover the liquor will only take up its own volume of the carbonic gas, whereas if a cover were used the leaching liquor would hold several times its volume of carbonic gas under a slight pressure. The compressed air is conveyed into the tank of ore to be leached through the bottom for the purpose of agitating the ore, and care must be taken not to admit the air under too great pressure, as "channeling" will result, which will retard the leaching of the ore. The liquefied carbon dioxid or carbonic-acid gas in the solution neutralizes to a great extent the injurious gases, as sulfur gases and sometimes chlorin, from the ore, which gases tend to retain the gold and retard the leaching. Furthermore, the carbonic-acid gas penetrates limestone ore and greatly facilitates the leaching of this kind of ore. It also helps to hold the soluble lime in suspension and keeps it from being precipitated, while the hydrate of calcium in the solution helps to neutralize ore acids, which would otherwise be injurious to the cyanid of potassium, and thus tend to retain the precious metal in the ore. The hydrate of calcium in solution will, moreover, form an insoluble compound with arsenical ore and neutralize its injurious effects as well as the injurious effects of sulfur. I have found that the use of liquefied carbon dioxid or carbonic-acid gas is of much more value in this connection than the bicarbonates of potassium, sodium, or ammonium, for the reason that the alkali of these metals would dissolve base ores, which would be injurious to the solution.

When it is desired to quicken the process of leaching, the compressed air may be slightly heated by a heating-furnace, through which a coil of the air-pipe passes.

The carbonic-acid gas in the solution materially assists the cyanid of potassium in extracting gold from the ore, and the presence of hydrate of calcium makes it possible to leach unroasted ore containing arsenic or sulfur by cyanid of potassium by forming an insoluble compound with said arsenic or sulfur, thus protecting the cyanid of potassium from the injurious effects of the arsenic or sulfur.

Where there is hydrate of lime in the solution, a part of the lime would combine with any soluble arsenic and form an insoluble compound of lime and arsenic and make arsenate of lime.

After draining the saturated leaching solution from the tank of ore a wash-water should be run through the tank of leached ore in order to wash out most of the gold solution which may have been retained in the leaching-tank. This wash-water after being drained from said tank is pumped back into the storage-tank to replenish the leaching solution.

The carbonic-acid gas to be used in my solution may be obtained from burning coal, where the same is employed to make steam, by introducing the smoke, some time after said coal is burned, into the leaching solution by means of a pipe, after first conveying said smoke upwardly through a perforated tray containing oxid of iron, in order to extract the sulfur from the smoke, then conveying said smoke through a wash-water to extract the ammonia and tarry matter therefrom. Another and a much cheaper way of utilizing the carbonic-acid gas from coal-smoke for my solution is to convey said smoke through a grate containing lumps of limestone, where a small spray of water is playing on the same. Said water would extract some of the sulfur from the smoke, as would also the dampened limestone, which would, moreover, give off carbonic gas, and thus enrich the smoke. The same is then conveyed to the leaching solution. This course can only be pursued when the coal contains less than five per cent. of sulfur, and wood-smoke should under no circumstances be used, by reason of the large volume of hydrogen contained therein.

Were it not for the hydrate of calcium and oxygen from the compressed air the ore would have to be roasted, thus making the process much more expensive, and consequently detracting from the value of the ore.

I wish to be fully understood as distinguishing between the use of hydrate of calcium and oxid of lime, and lay no claim to the latter, for the reason that the dissolving of the same into hydrate of calcium in the leaching liquor is so slow that the arsenic or sulfur in the arsenical or sulfid ores has injured the cyanid of potassium before the oxid of lime is dissolved, thus rendering its use of little or no value, whereas when the hydrate of calcium is thoroughly mixed with the leaching liquor before the same is run onto the ore to be leached the hydrate of calcium immediately neutralizes the most of the baseness of the ore.

When a solution contains a mixture of hydrocyanic acid and a carbonate or bicarbonate of an alkali, it is an excellent solvent for gold, provided oxygen be present. Therefore when the $CO_2$ breaks up KCy into $K_2CO_3$ or $KHCO_3$ and HCy the HCy is available for the solution of the gold.

After the ore is leached the solution is drained off into a sump-tank, where the gold is extracted by any well-known process, although I prefer to precipitate the gold by the use of zinc-dust. The leaching liquor can then be pumped back into the storage-tank and be strengthened. In this way the solution may be used over and over again, the pipes connecting the different tanks being provided with stop-cocks, so as to control and regulate the flow of the leaching liquor.

I lay no claim to the apparatus nor do I claim, broadly, the use of compressed air, and I do not wish to be understood as claiming an alkaline earth in solution, as ammonium, sodium, and potassium, but confine myself to hydrate of calcium, for the reason that the aforementioned earths being too alkaline are injurious, especially with arsenical ore, while hydrate of calcium keeps the arsenic or sulfur from becoming soluble, and thus protects the cyanid of potassium from their injurious effects; but What I do claim as new, and desire to secure by Letters Patent of the United States, is—

1. The herein-described process of extracting gold and silver from ore containing the same when in a suitable condition, which consists in subjecting the said ore to the leaching action of a solution of water, cyanid of potassium, hydrate of calcium and carbonic-acid gas, said gas being forced into the leaching solution simultaneously with compressed air, as and for the purposes set forth.

2. The herein-described process of extracting gold or silver from ore containing the same, when in a suitable condition, which consists in subjecting the said ore to the leaching action of a solution of water, cyanid of potassium and hydrate of calcium and carbonic-acid gas and introducing an oxidizing agent into the solution, and subsequently precipitating the gold from this solution, substantially as described.

In testimony whereof I affix my signature in presence of two witnesses.

THOMAS BUTLER JOSEPH.

Witnesses:
J. R. JARVIS,
W. T. MASON.